US008776236B2

(12) United States Patent
Sowder

(10) Patent No.: US 8,776,236 B2
(45) Date of Patent: Jul. 8, 2014

(54) SYSTEM AND METHOD FOR PROVIDING STORAGE DEVICE-BASED ADVANCED PERSISTENT THREAT (APT) PROTECTION

(75) Inventor: James L. Sowder, Fairfax, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 148 days.

(21) Appl. No.: 13/444,460

(22) Filed: Apr. 11, 2012

(65) Prior Publication Data

US 2013/0276122 A1 Oct. 17, 2013

(51) Int. Cl.
H04L 29/06 (2006.01)

(52) U.S. Cl.
USPC .......................................................... 726/24

(58) Field of Classification Search
CPC ....... G06F 21/00; G06F 21/56; G06F 21/566; G06F 12/14; G06F 7/04
USPC .......................................................... 726/24
See application file for complete search history.

(56) References Cited

U.S. PATENT DOCUMENTS

| | | | | | |
|---|---|---|---|---|---|
| 5,953,502 | A * | 9/1999 | Helbig, Sr. | | 726/24 |
| 6,038,667 | A * | 3/2000 | Helbig, Sr. | | 726/16 |
| 6,311,273 | B1 * | 10/2001 | Helbig et al. | | 726/2 |
| 7,024,403 | B2 * | 4/2006 | Kyler | | 1/1 |
| 7,617,255 | B2 * | 11/2009 | Kodama et al. | | 1/1 |
| 8,074,047 | B2 * | 12/2011 | Abali et al. | | 711/206 |
| 8,112,463 | B2 * | 2/2012 | Takaoka et al. | | 707/821 |
| 8,302,192 | B1 * | 10/2012 | Cnudde et al. | | 726/24 |
| 8,307,019 | B2 * | 11/2012 | Takaoka et al. | | 707/827 |
| 8,381,298 | B2 * | 2/2013 | Blumfield et al. | | 726/24 |
| 2002/0129277 | A1 * | 9/2002 | Caccavale | | 713/201 |
| 2003/0009681 | A1 * | 1/2003 | Harada et al. | | 713/193 |
| 2003/0187885 | A1 * | 10/2003 | Miyazaki et al. | | 707/203 |
| 2004/0255120 | A1 * | 12/2004 | Botti et al. | | 713/170 |
| 2005/0097318 | A1 * | 5/2005 | Bolosky et al. | | 713/165 |
| 2005/0273858 | A1 * | 12/2005 | Zadok et al. | | 726/24 |
| 2006/0026684 | A1 * | 2/2006 | Harvey et al. | | 726/23 |
| 2006/0143713 | A1 * | 6/2006 | Challener et al. | | 726/24 |
| 2006/0161988 | A1 * | 7/2006 | Costea et al. | | 726/25 |
| 2007/0198859 | A1 * | 8/2007 | Harada et al. | | 713/193 |
| 2007/0289019 | A1 * | 12/2007 | Lowrey | | 726/24 |
| 2008/0134333 | A1 * | 6/2008 | Shipp | | 726/23 |
| 2008/0167920 | A1 * | 7/2008 | Schmidt et al. | | 705/7 |
| 2009/0019246 | A1 * | 1/2009 | Murase | | 711/162 |
| 2009/0089593 | A1 * | 4/2009 | Kuno et al. | | 713/193 |
| 2009/0177721 | A1 * | 7/2009 | Mimatsu | | 707/205 |
| 2009/0287901 | A1 * | 11/2009 | Abali et al. | | 711/206 |
| 2009/0328221 | A1 * | 12/2009 | Blumfield et al. | | 726/24 |

(Continued)

*Primary Examiner* — David Garcia Cervetti

(74) *Attorney, Agent, or Firm* — Andrews Kurth LLP; Sean S. Wooden; Matthew J. Esserman

(57) ABSTRACT

An embodiment of a system and method for providing storage device-based advanced persistent threat (APT) protection receives a file write request of a file object, writes the file object to a temporary storage device, computes a hash value of the file object in the temporary storage device, and compares the hash value of the file object to hash values stored in an APT database to determine if the hash value of the file object exists in the APT database. If the hash value of the file object exists in the APT database, an embodiment writes the file object to a quarantine storage location and clears the file object from the temporary storage device. If the hash value of the file object does not exist in the APT database, an embodiment executes an APT analysis on the file object to determine if the file object presents an APT.

20 Claims, 8 Drawing Sheets

(56) References Cited

U.S. PATENT DOCUMENTS

| | | |
|---|---|---|
| 2010/0077013 A1* | 3/2010 | Clements et al. ............. 707/822 |
| 2010/0262797 A1* | 10/2010 | Rosikiewicz et al. ......... 711/162 |
| 2011/0107424 A1* | 5/2011 | Singh et al. .................... 726/24 |
| 2011/0258702 A1* | 10/2011 | Olney et al. .................... 726/24 |
| 2012/0151582 A1* | 6/2012 | Reasor et al. .................. 726/23 |
| 2012/0232679 A1* | 9/2012 | Abercrombie et al. ......... 700/44 |
| 2012/0304007 A1* | 11/2012 | Hanks et al. .................... 714/26 |
| 2013/0086688 A1* | 4/2013 | Patel et al. ...................... 726/25 |
| 2013/0117852 A1* | 5/2013 | Stute ............................... 726/23 |
| 2013/0191350 A1* | 7/2013 | Esaka et al. ................... 707/692 |
| 2013/0246795 A1* | 9/2013 | Shinde et al. ................. 713/176 |
| 2014/0026218 A1* | 1/2014 | Singh et al. .................... 726/23 |

\* cited by examiner

SYSTEM AND METHOD FOR PROVIDING STORAGE DEVICE-BASED ADVANCED PERSISTENT THREAT (APT) PROTECTION

BACKGROUND

An advanced persistent threat (APT) is a network attack in which an unauthorized person(s) attempts to gain access to a network through a long-term pattern of sophisticated exploits. Persons behind APT attacks typically have a full spectrum of intelligence-gathering techniques at their disposal. The intention of an APT attack is often to steal data rather than to cause damage to the network or organization. APT attacks target organizations in sectors with high-value information, such as national defense, manufacturing and the financial industry.

An APT detection process is typically based on static (e.g., non-executing) file object scans. This process systematically scans a binary file object searching for exact byte-level sequences previously identified to be present in known malware-embedded files. These sequences, commonly referred to as malware signatures, are typically a calculated numerical value (hash) of a 16 byte or greater section of code found within a known malware application(s). Many APT and advanced malwares demonstrate a polymorphic feature. This feature allows the malware to constantly mutate, or change, thereby rendering a traditional hash-based malware signature approach ineffective.

APT attacks can also include zero-day (i.e., original, occurring for the first time) type threats that exploit computer application vulnerabilities unknown to others (e.g., commercial software application developers). Traditional malware signature-based detection is not effective against zero-day exploits as the opportunity to define the malware signature in advance is not available. APT malware detection software must address obfuscation techniques aimed at masking a file object's content; address the polymorphic nature of malware; also employ an advanced analysis technique to detect newly developed malware in software; etc.

Furthermore, current APT malware detection software typically detects a malware-embedded file after it is stored within an organization's infrastructure (e.g., email server, file server, file transfer protocol (FTP) server). It would be advantageous to detect and remove a malware-embedded filed before it is stored and accessible from within an organization.

SUMMARY

An embodiment of a method for providing storage device-based advanced persistent threat (APT) protection includes, after receiving a file write request of a file object, writing the file object to a temporary storage device, computing a hash value of the file object in the temporary storage device, and comparing the hash value of the file object to hash values stored in an APT database to determine if the hash value of the file object exists in the APT database. The APT database stores hash values of file objects that present an APT. If the hash value of the file object exists in the APT database, an embodiment of the method writes the file object to a quarantine storage location, and clears the file object from the temporary storage device. If the hash value of the file object does not exist in the APT database, an embodiment of the method executes an APT analysis on the file object to determine based on APT signature file object characteristics if the file object presents an APT.

An embodiment of a system for providing storage device-based advanced persistent threat (APT) protection includes a persistent storage device, and a storage device server that communicates with the persistent storage device. The storage device server includes a temporary storage device and an APT logic manager that, after receiving a file write request of a file object, writes the file object to the temporary storage device, computes a hash value of the file object in the temporary storage device, and compares the hash value of the file object to a plurality of hash values stored in an APT database to determine if the hash value of the file object exists in the APT database. The APT database stores the plurality of hash values of file objects that present an APT. If the hash value of the file object exists in the APT database, an embodiment of the system writes the file object to a quarantine storage location, and clears the file object from the temporary storage device. If the hash value of the file object does not exist in the APT database, an embodiment of the system executes an APT analysis on the file object to determine based on APT signature file object characteristics if the file object presents an APT.

An embodiment of a non-transitory computer readable medium provides instructions for providing storage device-based advanced persistent threat (APT) protection. The instructions include, after receiving a file write request of a file object, writing the file object to a temporary storage device, computing a hash value of the file object in the temporary storage device, and comparing the hash value of the file object to a plurality of hash values stored in an APT database to determine if the hash value of the file object exists in the APT database. The APT database stores the plurality of hash values of file objects that present an APT. If the hash value of the file object exists in the APT database, the instructions include writing the file object to a quarantine storage location, and clearing the file object from the temporary storage device. If the hash value of the file object does not exist in the APT database, the instructions include executing an APT analysis on the file object to determine based on APT signature file object characteristics if the file object presents an APT.

DESCRIPTION OF THE DRAWINGS

The detailed description will refer to the following drawings, wherein like numerals refer to like elements, and wherein.

DETAILED DESCRIPTION

Figure 1:
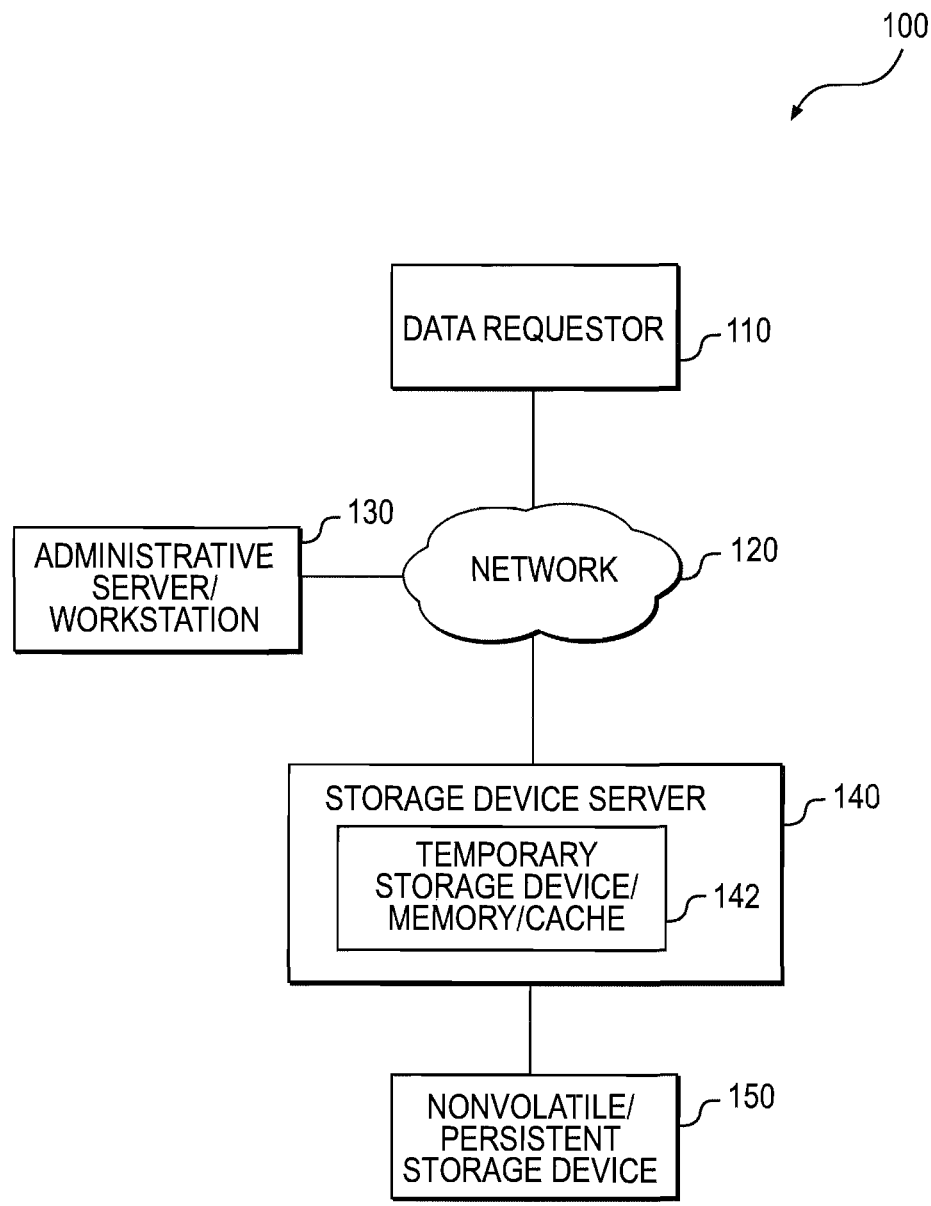
FIG. 1 illustrates an embodiment of a system for providing storage device-based APT protection.

Embodiments of a system and method are disclosed for providing storage device-based advanced persistent threat (APT) protection. An embodiment of the system and method receives a file write request of a file object, writes the file object to a temporary storage device, computes a hash value of the file object in the temporary storage device, and compares the hash value of the file object to hash values stored in an APT database to determine if the hash value of the file object exists in the APT database. The APT database stores hash values of file objects that present an APT. If the hash value of the file object exists in the APT database, an embodiment of the system and method writes the file object to a quarantine storage location, and clears the file object from the temporary storage device. If the hash value of the file object does not exist in the APT database, an embodiment of the system and method executes an APT analysis on the file object to determine if the file object presents an APT. If the file object is determined to present an APT, an embodiment of the system and method adds the hash value of the file object and metadata of the file object to the APT database, writes the file object to a quarantine storage location, and clears the file object from the temporary storage device. If the file object does not present an APT, an embodiment of the system and method writes the file object to a persistent storage device. As a result, a file object that presents an APT is uncovered before written to the persistent storage device.

As noted above, an APT is a network attack in which an unauthorized person(s) attempts to gain access to a network through a long-term pattern of sophisticated exploits. Persons behind an APT typically have a full spectrum of intelligence-gathering techniques at their disposal. The intention of an APT attack is often to steal data rather than to cause damage to the network or organization. APT attacks target organizations in sectors with high-value information, such as national defense, manufacturing and the financial industry.

An APT detection process is typically based on static (e.g., non-executing) file object scans. This process systematically scans a binary file object searching for exact byte-level sequences previously identified to be present in known malware-embedded files. These sequences, commonly referred to as malware signatures, are typically a calculated numerical value (hash) of a 16 byte or greater section of code found within a known malware application(s). Many APT and advanced malwares demonstrate a polymorphic feature. This feature allows the malware to constantly mutate, or change, thereby rendering a traditional hash-based malware signature approach ineffective. APT attacks can also include zero-day (i.e., original, occurring for the first time) type threats that exploit computer application vulnerabilities unknown to others (e.g., commercial software application developers). Traditional malware signature-based detection is not effective against zero-day exploits as the opportunity to define the malware signature in advance is not available. APT malware detection software must address obfuscation techniques aimed at masking a file object's content; address the polymorphic nature of malware; also employ an advanced analysis technique to detect newly developed malware in software; etc.

Various commercial data storage vendors, such as NetApp, EMC, IBM, Hitachi, etc., apply block-level identification of exact data matches to eliminate storage of duplicate data. This storage device-based data de-duplication process maintains an encoded (e.g., SLA-1 or MD-5 hash) index of previously stored data blocks. If a to-be stored data block matches an entry in the index, a pointer to the previously stored block is maintained as opposed to the storage of a duplicate block of data. Accordingly, this storage device-based data de-duplication process provides a highly efficient pattern match to leverage the processing power of the storage device.

An embodiment of the system and method for providing storage device-based APT protection exploits the processing similarities of the APT detection process and the storage controller-based data de-duplication process. The result is a storage device-based implementation of an APT detection or protection technique. As the storage device (also referred to as storage controller) prepares to store a file object, the pattern matching and file object analysis process of the APT detection process is executed, leveraging the processing execution structure implemented in the storage controller-based data de-duplication process. A file object can be identified as potentially containing malware as an integral part of the data storage process before the file object is written to a storage device, rather than by a subsequent process. In other words, if a file object is identified as potentially containing malware, the file object is immediately flagged and is not made available for retrieval by a typical application process.

An embodiment of the system and method for providing storage device-based APT protection prevents the storage and subsequent use of malware resident data file objects. An embodiment of the system and method avoids reliance on a separate post-processing (post-data storage) events to detect presence of malware by inserting the APT malware detection process at the earliest point in the data lifecycle, e.g., at the point of storage within the organization's infrastructure. If applied at the edge, i.e., point of storage, of an organization's infrastructure, an APT malware-embedded file object is never even stored within the organization. Email is currently the most prevalent malware attack vector. Preventing the storage of malware resident email messages using a storage device attached to an organization's email server can greatly reduce the threat of the attack. In a similar manner, other devices (e.g., file server, file transfer protocol (FTP) server) vulnerable to APT penetration are protected.

FIG. 1 illustrates an embodiment of a system 100 for providing storage device-based APT protection. An embodiment of the system 100 includes a storage device server 140 that is connected to a data source or data requestor 110 and an administrative server or workstation 130 though a network 120. The data source or data requestor 110 may be any service that needs persistent storage of a file object. Potential data sources or data requestors may be a software application (e.g., email system, web server, FTP server) or a network user-initiated process (e.g., file save, office productivity application). The administrative server or workstation 130 can be an APT protection administrative server or workstation. The administrative server or workstation establishes and manages quarantine storage and permissions by maintaining an APT rule set 306, a version and/or configuration of an APT engine 308, and an APT activity log 310 (all shown in FIG. 3).

The storage device server 140 provides a block-level or file-level access to storage devices, such as storage area network (SAN) or network attached storage (NAS). The storage device server 140 includes a temporary storage device (also referred to as memory or cache) 142. The temporary storage device 142 temporarily stores a file object before the storage device server determines if the file object presents an APT. The storage device server 140 is connected to a persistent storage device (also referred to as nonvolatile storage device) 150. A file object is stored in the persistent storage device 150 only after the storage device server 140 determines that the file object does not present an APT.

Figure 2:
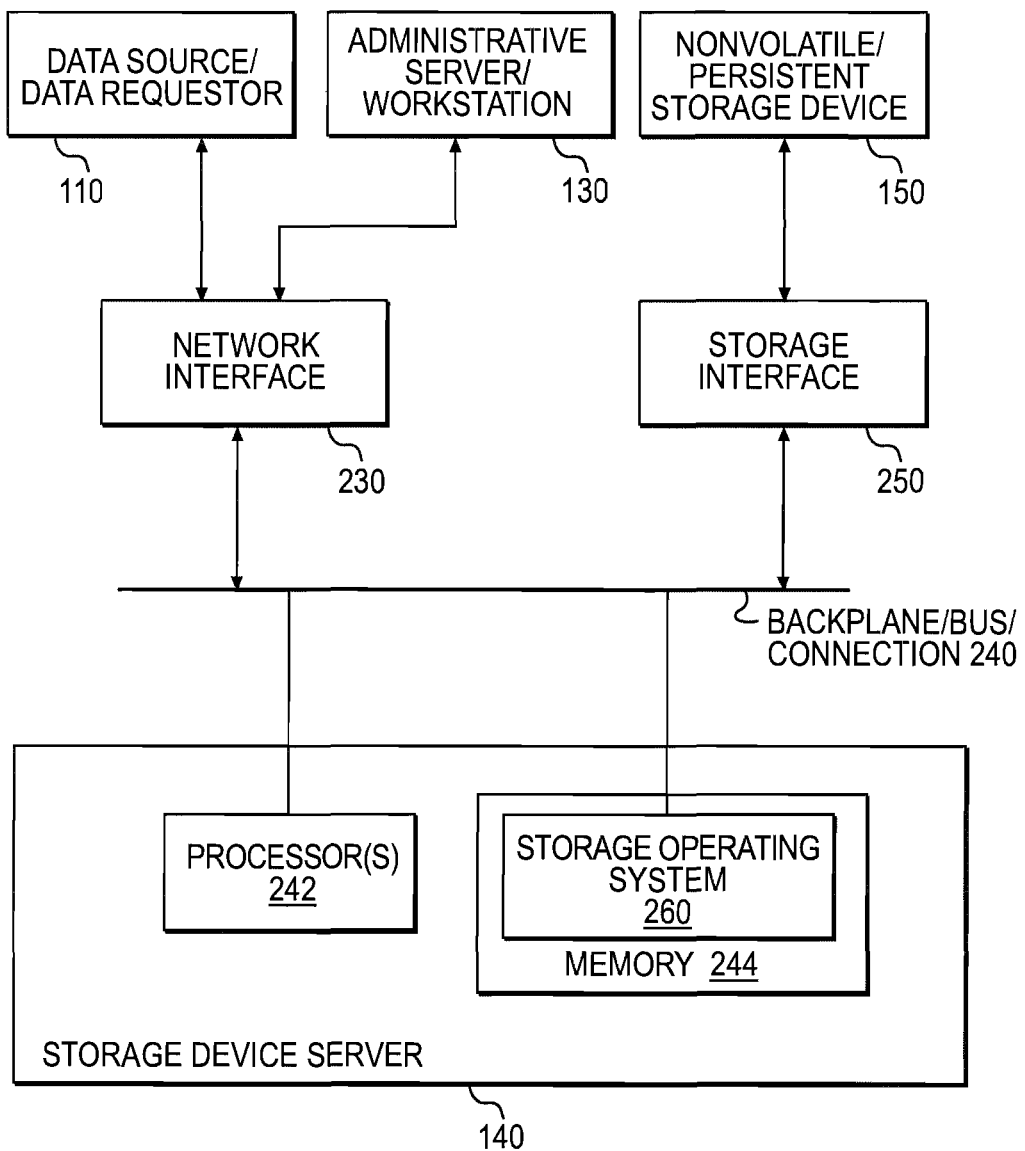
FIG. 2 is block diagram showing data flow to and from various devices of an embodiment of a system for providing storage device-based APT protection.

FIG. 2 is block diagram showing data flow to and from various devices of an embodiment of system 100 for providing storage device-based APT protection. The storage device server 140 communicates with the data source or data requestor 110 and the administrative server or workstation 130 through a network interface 230 and a backplane (also referred to as bus or connection) 240. The network interface 230 provides an interface between the storage device server 140 and the data source or data requestor 110 or the administrative server or workstation 130. The backplane 240 provides the interconnect of components composing the storage device server 140. The storage device server 140 similarly communicates with the persistent storage device 150 though a storage interface 250 and the backplane 240. The storage interface 250 provides an interface between the storage device server 140 and persistent storage device 150.

An embodiment of the storage device server 140 includes at least one processor 242 and a memory 244, which stores a storage operating system 260. The storage operating system 260 controls the operations of the storage device server 140 much like the operating system allows the function of a general purpose computer. The storage operating system 260 is functionally scoped to focus on file object storage-related processes, to include those processes related to APT protection.

Figure 3:
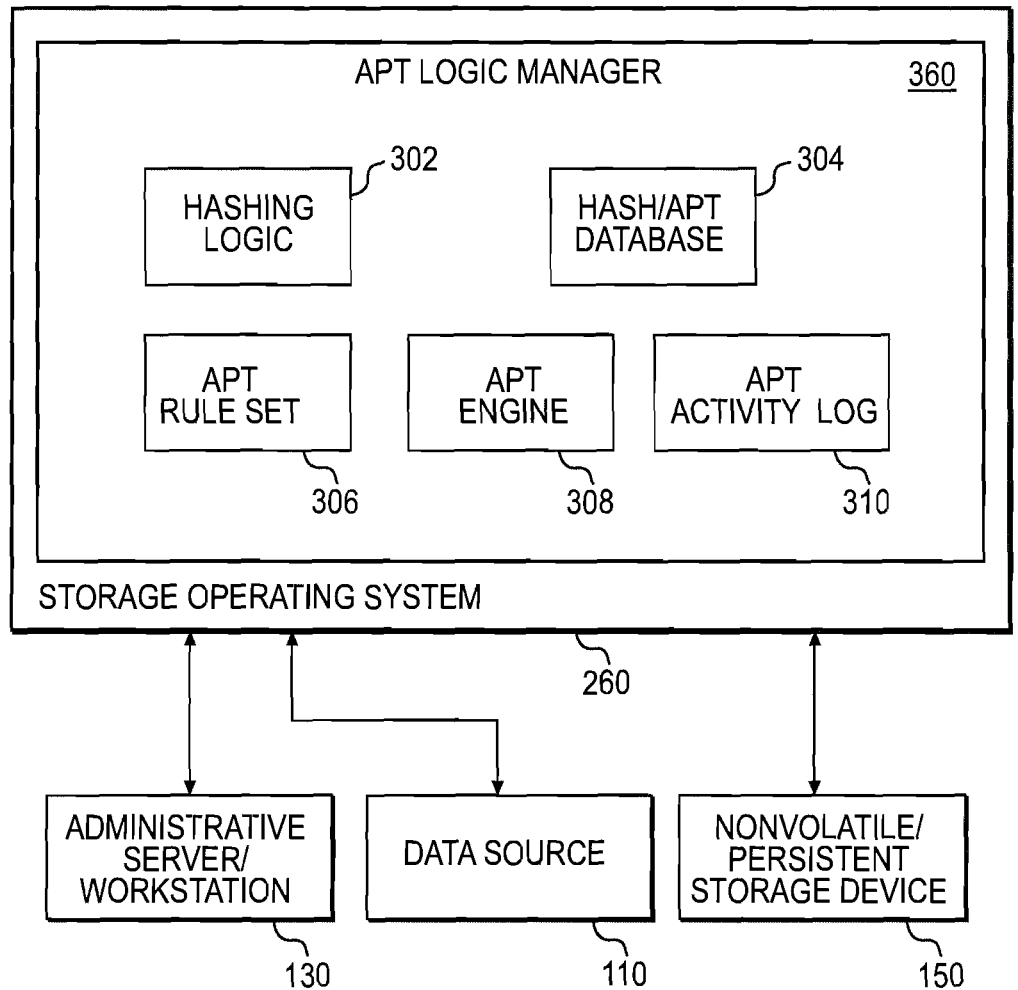
FIG. 3 illustrates an embodiment of the storage operating system of FIG. 2 in detail.

FIG. 3 illustrates an embodiment of the storage operating system 260 of FIG. 2 in detail. The storage operating system 260 includes an APT logic manager 360, which includes a hashing logic 302, an APT database (also referred to as hash database) 304, an APT rule set 306, an APT engine 308, and an APT activity log 310. The APT logic manager 360 controls execution of the process to determine whether a file object presents an APT and controls the process for maintenance of data regarding the results of the APT determination. The hashing logic 302 provides the computational algorithm to perform a cryptographic hash function on the file object. The function returns a unique hash value (i.e., fixed-size byte string) representation of the file object. The APT database 304 maintains an inventory of hash values for file objects previously determined to present an APT.

The APT rule set 306 includes the collection of values or parameters (e.g., APT signatures, risk values, risk threshold) used by the APT engine 308. The APT engine 308 accepts the APT rule set 306 as runtime settings. The APT engine 308 provides the processing logic to determine if a file object presents an APT. The processing logic includes Preprocessing, Analysis, and Risk Assessment. An embodiment of this logic first preprocesses the file object as needed to decode, uncompress, or de-obfuscate the sub-content of the object. The constituent file objects are extracted for APT analysis depending on the file object type (e.g., Multipurpose Internet Mail Extensions (MIME), encoded email message, archive file (e.g., tape archive (TAR), Roshal archive (RAR)), and compressed or encoded file (e.g., ZIP)). Each individual object is analyzed via a test or series of tests. An embodiment of this analysis determines the coincidence of specific ATP signatures or n-grams (substrings of a specified length (nominally 4-6 bytes)) of a larger byte string, each substring offset by a specified length (nominally 1 byte)) found in the file object as compared to n-grams previously found to exist in high frequency in a gallery of file objects known to contain malware. This specific analysis is optimized through concurrent execution with existing storage controller-based data de-duplication processes. An embodiment of the logic then assigns a risk value based upon the results of the preceding analysis(es). File objects exceeding a specified risk threshold are deemed to represent an APT. The APT activity log 310 maintains a listing of APT process-related events and status.

Figure 4:
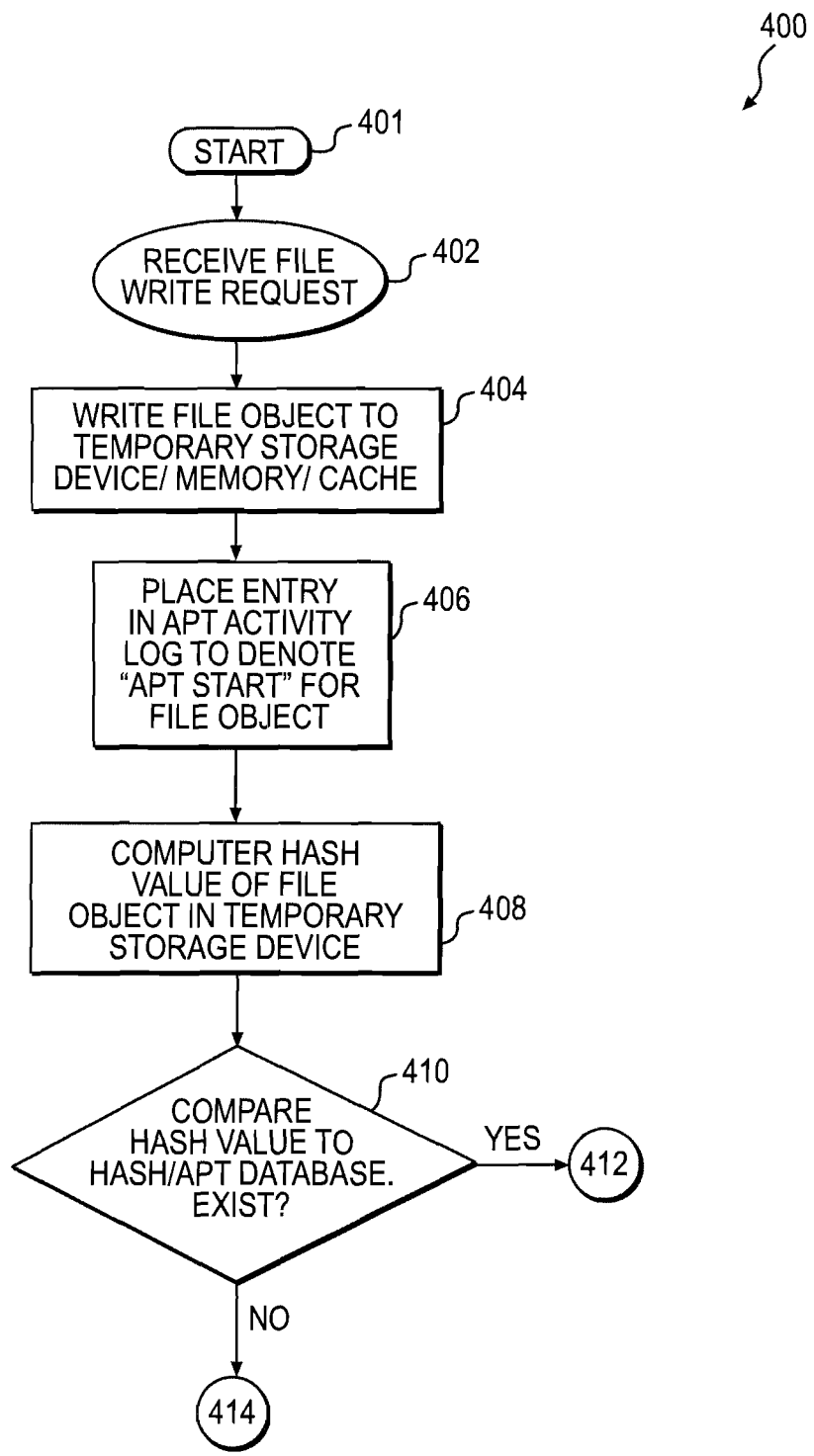
FIG. 4 is a flow chart illustrating an embodiment of a write request process of a method for providing storage device-based APT protection.

FIG. 4 is a flow chart illustrating an embodiment of a write request process 400 of a method for providing storage device-based APT protection.

An embodiment of the write request process 400 starts 401 by receiving a file write request for a file object (block 402). An embodiment of the write request process 400 writes the file object to a the temporary storage device 142 (block 404) and places the entry in the APT activity log 310 to denote, e.g., "APT Start," for the file object (block 406). An embodiment of the write request process 400 uses hashing logic 302 to compute a hash value of the file object in the temporary storage device 142, such as SHA-1 or MD5. Next, an embodiment of the write request process 400 compares the hash value of the file object to what is stored in the APT database 304 to determine if the hash value of the file object exists in the APT database 304 (block 410).

Figure 5:
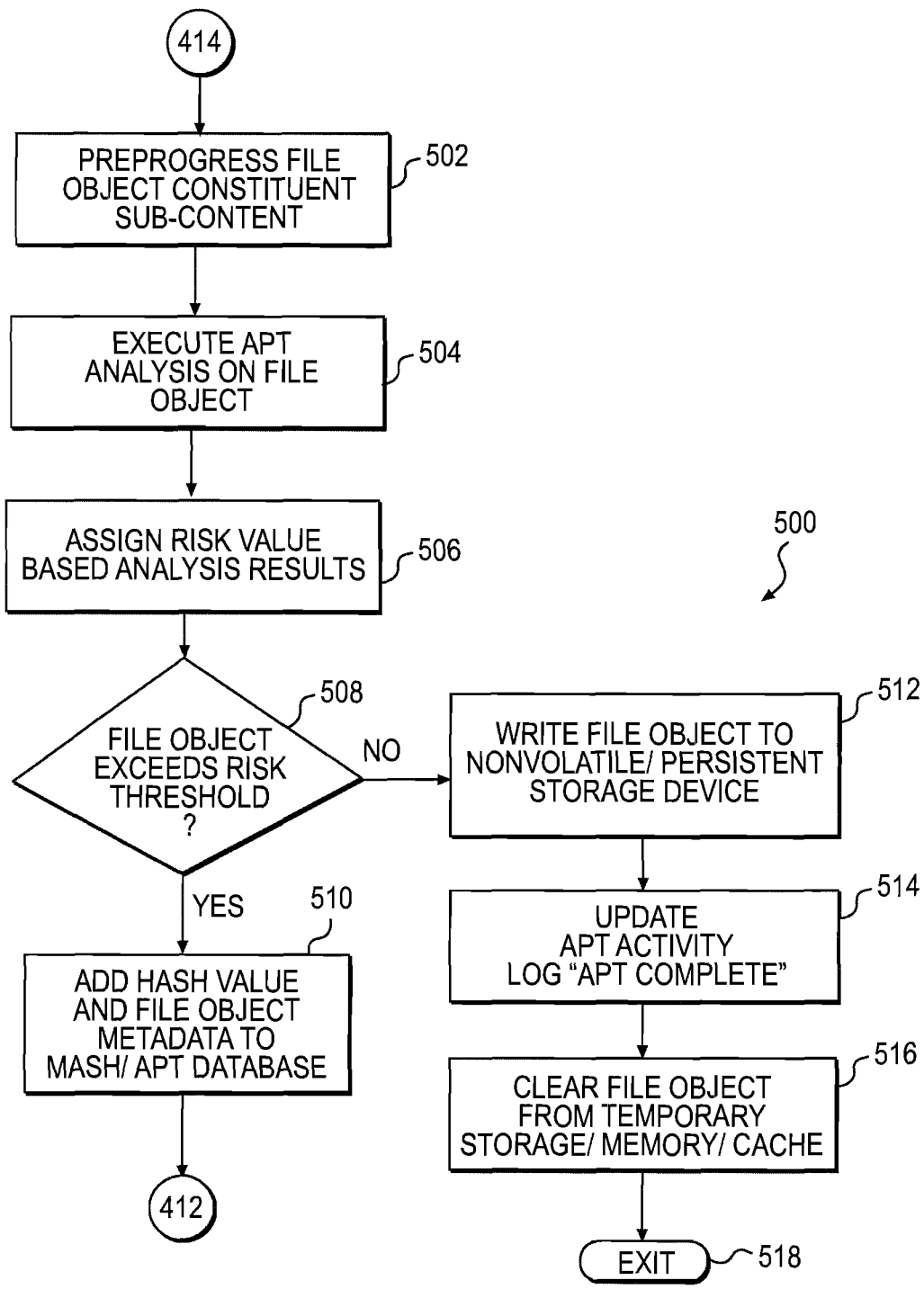
FIG. 5 is a flow chart illustrating an embodiment of an APT determination process of a method for providing storage device-based APT protection.
Figure 6:
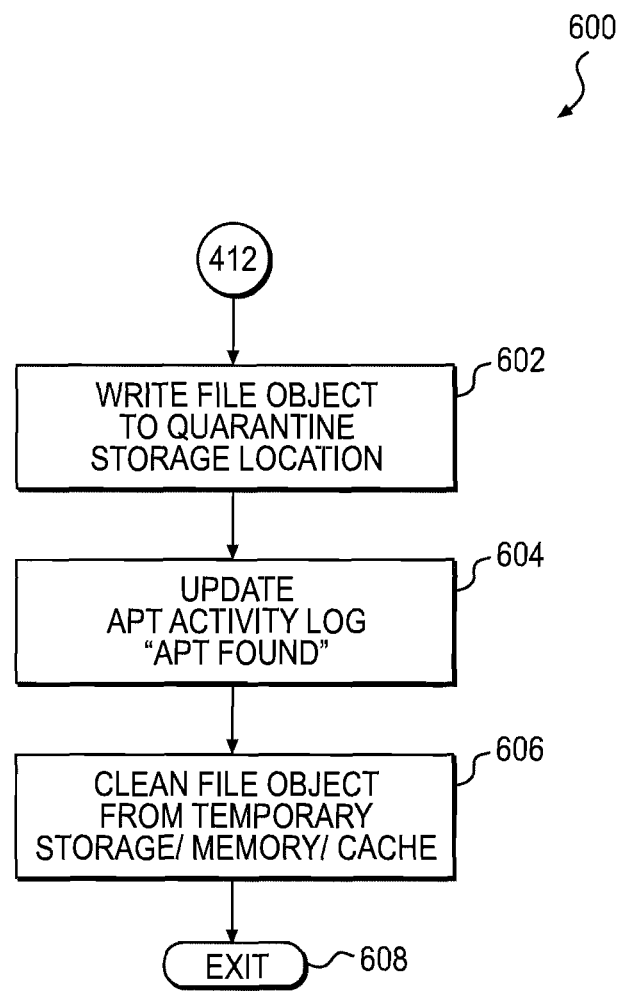
FIG. 6 is a flow chart illustrating an embodiment of a quarantine process of a method for providing storage device-based APT protection.

If the hash value of the file object exists in the APT database 304, the process goes to block 412 shown in FIG. 6. If the hash value of the file object does not exist, the process goes to block 414 shown in FIG. 5.

FIG. 5 is a flow chart illustrating an embodiment of an APT determination process 500 of a method for providing storage device-based APT protection. An embodiment of the APT determination process 500 starts with block 414 and executes an APT analysis procedure on the file object using, e.g., the APT rule set 306 and the APT engine 308. This analysis procedure preprocesses the file object, as necessary, to decode, uncompress, or de-obfuscate the contents of the file object (block 502). The APT analysis procedure applies a static examination (interrogates the file but does not attempt to execute the file) leveraging the execution similarities of the existing storage controller-based data de-duplication process. An embodiment of the APT determination process 500 determines the coincidence of specific ATP signatures or n-grams found in the file object as compared to n-grams previously found to exist in high frequency in a gallery of file objects known to contain malware (block 504). A risk value is assigned based on the results of the analysis (block 506). If the file object exceeds the specified risk threshold it is determined to present an APT (block 508). An embodiment of the APT determination process 500 adds the hash value of the file object and the file object's metadata to the APT database 304 (block 510), and the process goes to block 412.

If the file object does not present an APT, an embodiment of the APT determination process 500 writes the file object to the persistent storage device 150 (block 512), updates the APT activity log 310 as, e.g., "APT Complete" (block 514), and clears the file object from the temporary storage device 142 (block 516). The process exists at block 518.

FIG. 6 is a flow chart illustrating an embodiment of a quarantine process 600 of a method for providing storage device-based APT protection. An embodiment of the quarantine process 600 starts with block 412 and writes the file object to a quarantine storage location (block 602). An embodiment of the quarantine process 600 updates the APT activity log 310 as, e.g., "APT Found" (block 604). The APT activity log 310 may be updated with, e.g., file name or identifier, write request process or user, APT statistics, and time and date. An embodiment of the quarantine process 600 then clears the file object from the temporary storage device 142 (block 606). The process exists at block 608.

Figure 7:
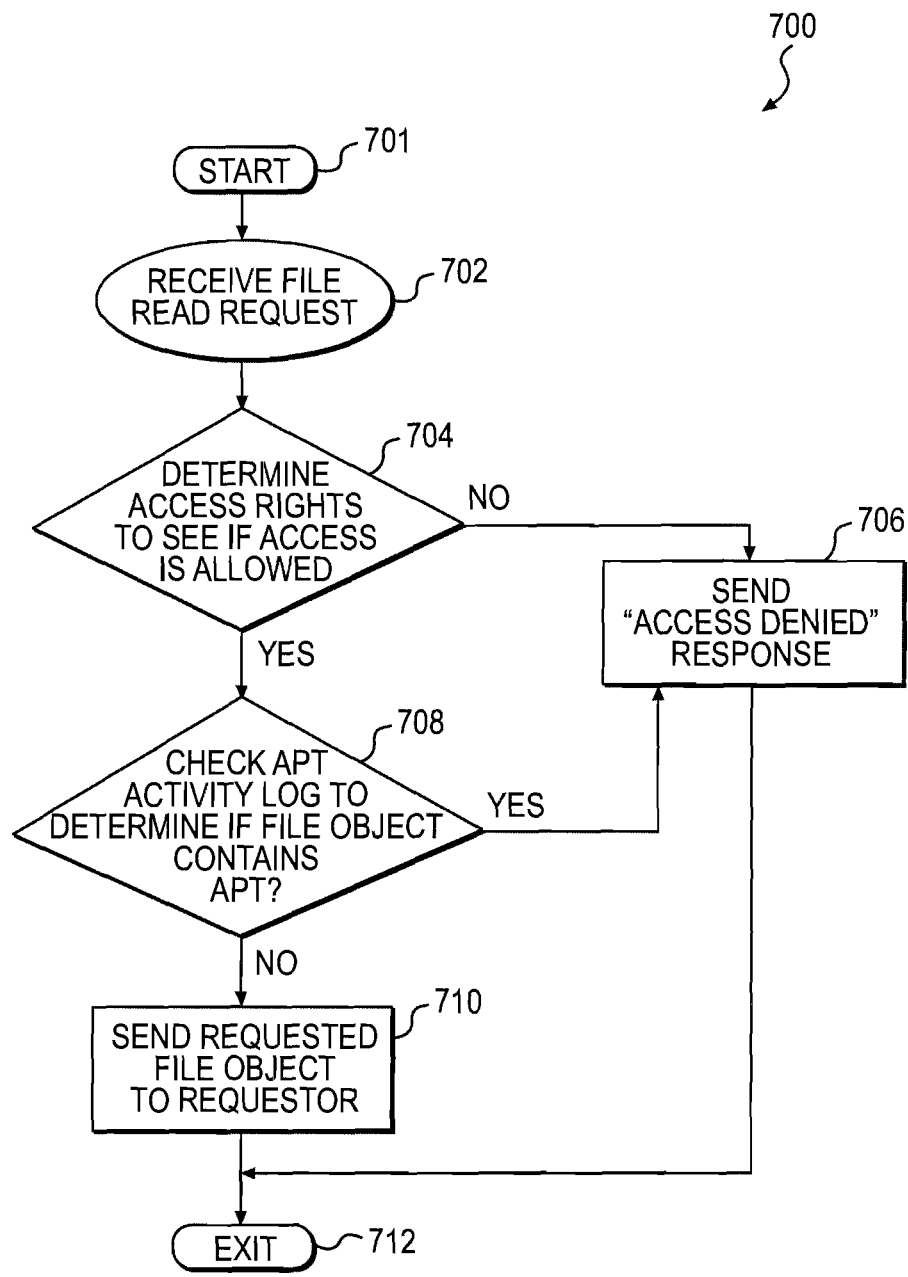
FIG. 7 is a flow chart illustrating an embodiment of a read/access request process of a method for providing storage device-based APT protection.

FIG. 7 is a flow chart illustrating an embodiment of a read or access request process 700 of a method for providing storage device-based APT protection. An embodiment of the read or access request process 700 starts 701 by receiving a file read request for a file object from a data requestor (block 702). The data requestor may be a software application (e.g., email system, web server, FTP server) or a network user-initiated process (e.g., file save, office productivity application). An embodiment of the read or access request process 700 determines access rights of the requestor to see if access is allowed (block 704). If access is not allowed, an embodiment of the read or access request process 700 sends, e.g., a "Access Denied" response (block 706) and exists (block 712). If access is allowed, an embodiment of the read or access request process 700 checks the APT activity log 310 to determine if the requested file object contains an APT (block 708).

If the file object is determined to contain an APT, an embodiment of the read or access request process 700 sends, e.g., a "Access Denied" response (block 706) and exits 712. If the file object is determined to not contain an APT, an embodiment of the read or access request process 700 sends the requested file object to the requestor (block 710) and exits (block 712).

Figure 8:
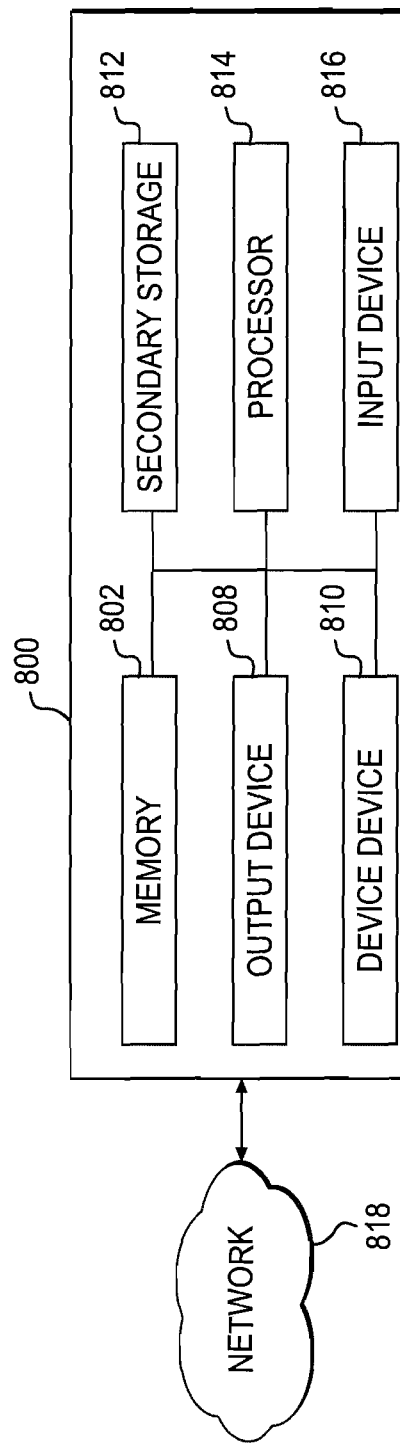
FIG. 8 is a block diagram illustrating exemplary hardware components for implementing embodiments of the system of FIG. 1 and method of FIGS. 4-7 for providing storage device-based APT protection.

FIG. 8 is a block diagram illustrating exemplary hardware components for implementing embodiments of the system 100 of FIG. 1 and method of FIGS. 4-7 for providing storage device-based APT protection. A server 800, or other computer system similarly configured, may include and execute programs to perform functions described herein, including steps of method of FIGS. 4-7 described above. Likewise, a mobile device that includes some of the same components of the computer system 800 may perform steps of the method of FIGS. 4-7 described above. The computer system 800 may connect with a network 818, e.g., Internet, or other network, to receive inquires, obtain data, and transmit information and incentives as described above. The network 818 may be the network 120 described in FIG. 1.

The computer system 800 typically includes a memory 802, a secondary storage device 812, and a processor 814. The computer system 800 may also include a plurality of processors 814 and be configured as a plurality of, e.g., bladed servers, or other known server configurations. The computer system 800 may also include an input device 816, a display device 810, and an output device 808.

The memory 802 may include the memory 244 described in FIG. 2 and include RAM or similar types of memory, and it may store one or more applications for execution by the processor 814. The secondary storage device 812 may include a hard disk drive, floppy disk drive, CD-ROM drive, or other types of non-volatile data storage. The processor 814 may include the processors 242 described in FIG. 2 and may execute the application(s) that are stored in the memory 802 or the secondary storage 812, or received from the Internet or other network 818. The processing by the processor 814 may be implemented in software, such as software modules, for execution by computers or other machines. These applications preferably include instructions executable to perform the functions and methods described above and illustrated in the Figures herein. The applications preferably provide graphic user interfaces (GUIs) through which users may view and interact with the application(s), such as the software package 206.

Also, as noted, the processor 814 may execute one or more software applications in order to provide the functions described in this specification, specifically to execute and perform the steps and functions in the methods described above. Such methods and the processing may be implemented in software, such as software modules, for execution by computers or other machines.

The input device 816 may include any device for entering information into the computer system 800, such as a touch-screen, keyboard, mouse, cursor-control device, microphone, digital camera, video recorder or camcorder. The input device 816 may be used to enter information into GUIs during performance of the methods described above. The display device 810 may include any type of device for presenting visual information such as, for example, a computer monitor or flat-screen display (or mobile device screen). The output device 808 may include any type of device for presenting a hard copy of information, such as a printer, and other types of output devices include speakers or any device for providing information in audio form.

Examples of the computer system 800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 800 is shown in detail, the system for providing storage device-based APT protection may use multiple computer systems or servers as necessary or desired to support the users and may also use back-up or redundant servers to prevent network downtime in the event of a failure of a particular server. In addition, although the computer system 800 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, such as the computer system 800, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for providing storage device-based advanced persistent threat (APT) protection, the method being implemented by a computer including at least one processor, the method comprising:

after receiving a file write request to write a file object to a persistent storage device, writing the file object to a temporary storage device;

computing, using the at least one processor, a hash value of the file object in the temporary storage device;

comparing, using the at least one processor, the hash value of the file object to a plurality of hash values stored in an APT database to determine if the hash value of the file object exists in the APT database, wherein the APT database stores the plurality of hash values of file objects that present an APT;

if the hash value of the file object exists in the APT database, writing the file object to a quarantine storage location, and clearing the file object from the temporary storage device; and if the hash value of the file object does not exist in the APT database, executing an APT analysis on the file object to determine based on APT signature file object characteristics if the file object presents an APT.

2. The method of claim 1, wherein the executing step comprises:
if the file object presents an APT, adding the hash value of the file object and metadata of the file object to the APT database, and clearing the file object from the temporary storage device; and
if the file object does not present an APT, writing the file object to the persistent storage device.

3. The method of claim 1, wherein a file object that presents an APT is uncovered before written to the persistent storage device.

4. The method of claim 1, further comprising placing an entry of the file object in an APT activity log to denote APT start for the file object after writing the file object to the temporary storage device.

5. The method of claim 1, wherein the executing the APT analysis step further comprises if the file object does not present an APT, updating an APT activity log as APT complete after writing the file object to the persistent storage device, and clearing the file object from the temporary storage device.

6. The method of claim 1, wherein the persistent storage device is a nonvolatile storage device.

7. The method of claim 1, further comprising if the hash value of the file object exists in the APT database, updating an APT activity log as APT found after writing the file object to the quarantine storage location.

8. The method of claim 1, wherein the temporary storage device is one of a memory and a cache.

9. A method for providing storage device-based advanced persistent threat (APT) protection, the method being implemented by a computer including at least one processor, the method comprising:
after receiving a file write request to write a file object to a persistent storage device, writing the file object to a temporary storage device;
computing, using the at least one processor, a hash value of the file object in the temporary storage device;
comparing, using the at least one processor, the hash value of the file object to a plurality of hash values stored in an APT database to determine if the hash value of the file object exists in the APT database, wherein the APT database stores the plurality of hash values of file objects that present an APT;
if the hash value of the file object exists in the APT database, writing the file object to a quarantine storage location, and clearing the file object from the temporary storage device;
if the hash value of the file object does not exist in the APT database, executing an APT analysis on the file object to determine based on APT signature file object characteristics if the file object presents an APT
after receiving a file read request for a file object from a requestor, determining if the requestor has an access right to access the file object;
if the requestor has the access right to access the file object, checking an APT activity log to determine if the file object contains an APT; and
if the requestor does not have the access right to access the file object or if the file object contains an APT, sending an access denied response to the requestor.

10. The method of claim 9, further comprising:
if the requestor has the access right to access the file object and if the file object does not contain an APT, sending the requested file object to the requestor.

11. A system for providing storage device-based advanced persistent threat (APT) protection, comprising:
a persistent storage device; and
a storage device server that communicates with the persistent storage device, the storage device server comprising a temporary storage device and an APT logic manager that:
after receiving a file write request to write a file object to the persistent storage device, writes the file object to the temporary storage device,
computes a hash value of the file object in the temporary storage device,
compares the hash value of the file object to a plurality of hash values stored in an APT database to determine if the hash value of the file object exists in the APT database, wherein the APT database stores the plurality of hash values of file objects that present an APT;
if the hash value of the file object exists in the APT database, writes the file object to a quarantine storage location, and clears the file object from the temporary storage device; and
if the hash value of the file object does not exist in the APT database, executes an APT analysis on the file object to determine based on APT signature file object characteristics if the file object presents an APT.

12. The system of claim 11, wherein the APT logic manager executes the APT analysis by:
if the file object presents an APT, adding the hash value of the file object and metadata of the file object to the APT database, and clearing the file object from the temporary storage device; and
if the file object does not present an APT, writing the file object to the persistent storage device.

13. The system of claim 11, wherein the APT logic manager includes a hashing logic, the APT database, an APT rule set, an APT engine, and an APT activity log.

14. The system of claim 13, wherein the storage device server further communicates with a data source or data requestor and an administrative server using a network, wherein the administrative server maintains the APT rule set, a version and/or configuration of the APT engine, and the APT activity log.

15. The system of claim 14, wherein the storage device server communicates with the data source or data requestor and the administrative server using a network interface and a backplane connection.

16. The system of claim 11, wherein the storage device server communicates with the persistent storage device using a storage interface and a backplane connection.

17. The system of claim 11, wherein the storage device server further includes at least one processor and a memory that stores a storage operating system, wherein the storage operating system includes the APT logic manager.

18. The system of claim 11, wherein the APT logic manager uncovers a file object that presents an APT before writing to the persistent storage device.

19. A system for providing storage device-based advanced persistent threat (APT) protection, comprising:
a persistent storage device; and
a storage device server that communicates with the persistent storage device, the storage device server comprising a temporary storage device and an APT logic manager that:
after receiving a file write request to write a file object to the persistent storage device, writes the file object to the temporary storage device,
computes a hash value of the file object in the temporary storage device, compares the hash value of the file object to a plurality of hash values stored in an APT database to determine if the hash value of the file object exists in the APT database, wherein the APT database stores the plurality of hash values of file objects that present an APT;

if the hash value of the file object exists in the APT database, writes the file object to a quarantine storage location, and clears the file object from the temporary storage device;

if the hash value of the file object does not exist in the APT database, executes an APT analysis on the file object to determine based on APT signature file object characteristics if the file object presents an APT;

after receiving a file read request for a file object from a requestor, determines if the requestor has an access right to access the file object, if the requestor has the access right to access the file object, checks an APT activity log to determine if the file object contains an APT; and if the requestor does not have the access right to access the file object or if the file object contains an APT, sends an access denied response to the requestor.

20. A non-transitory computer readable medium providing instructions for providing storage device-based advanced persistent threat (APT) protection, the instructions comprising:

after receiving a file write request to write a file object to a persistent storage device, writing the file object to a temporary storage device;

computing a hash value of the file object in the temporary storage device;

comparing the hash value of the file object to a plurality of hash values stored in an APT database to determine if the hash value of the file object exists in the APT database, wherein the APT database stores the plurality of hash values of file objects that present an APT;

if the hash value of the file object exists in the APT database, writing the file object to a quarantine storage location, and clearing the file object from the temporary storage device; and if the hash value of the file object does not exist in the APT database, executing an APT analysis on the file object to determine based on APT signature file object characteristics if the file object presents an APT.

* * * * *